(12) United States Patent
Underwood

(10) Patent No.: US 11,703,415 B2
(45) Date of Patent: Jul. 18, 2023

(54) HIGH INTENSITY VIBRATION TESTING USING AN EMPIRICALLY MODIFIED REFERENCE SPECIFICATION AND METHOD THEREOF

(71) Applicant: Marcos Underwood, Cupertino, CA (US)

(72) Inventor: Marcos Underwood, Cupertino, CA (US)

( * ) Notice: Subject to any disclaimer, the term of this patent is extended or adjusted under 35 U.S.C. 154(b) by 0 days.

(21) Appl. No.: 16/748,091

(22) Filed: Jan. 21, 2020

(65) Prior Publication Data

US 2020/0232874 A1 Jul. 23, 2020

Related U.S. Application Data

(60) Provisional application No. 62/794,564, filed on Jan. 19, 2019.

(51) Int. Cl.
*G01M 7/02* (2006.01)
(52) U.S. Cl.
CPC .................................. *G01M 7/025* (2013.01)
(58) Field of Classification Search
None
See application file for complete search history.

(56) References Cited

U.S. PATENT DOCUMENTS

| 4,782,324 A | 11/1988 | Underwood |
| 5,299,459 A | 4/1994 | Underwood |
| 5,332,061 A | 7/1994 | Majeed et al. |
| 5,517,426 A | 5/1996 | Underwood |
| 6,876,957 B1 * | 4/2005 | Stewart ................. G01M 7/022 702/56 |

(Continued)

FOREIGN PATENT DOCUMENTS

| JP | 2009-192363 A | 8/2009 |
| JP | 2015-501431 A | 1/2015 |
| WO | 2013/063491 A1 | 5/2013 |

OTHER PUBLICATIONS

International Search Report and Written Opinion, International Application No. PCT/US20/14422, dated Apr. 21, 2020.

(Continued)

*Primary Examiner* — Matthew G Marini
(74) *Attorney, Agent, or Firm* — Medler Ferro Woodhouse & Mills PLLC

(57) ABSTRACT

An acoustic or mechanical vibration testing system includes a MIMO control system coupled to at least two separately controllable groups of vibration transducers and at least two control sensor transducers wherein the number of control sensor transducers need not be equal to the number of controller output drives or number of separately controllable groups of vibration transducers. The MIMO control system utilizes both a predetermined initial reference specification and a modified reference specification, wherein data acquired during system operation under conventional MIMO control is used to create the modified reference specification based on actual system performance and limitations thereof so as to maintain closer correspondence to the predetermined initial reference specification with less required system drive power, as a function of the predetermined initial reference, and less risk of damage to the test system and the test article during the performance of a test.

7 Claims, 11 Drawing Sheets

Block Diagram of Existing MIMO Mechanical and Acoustic Vibration Controller

(56) References Cited

U.S. PATENT DOCUMENTS

| | | | | |
|---|---|---|---|---|
| 8,393,206 | B1* | 3/2013 | Chen | G01M 9/08 |
| | | | | 73/147 |
| 8,408,066 | B1* | 4/2013 | Romero | G01M 7/022 |
| | | | | 73/761 |
| 9,109,972 | B2 | 8/2015 | Larkin et al. | |
| 2003/0040818 | A1* | 2/2003 | Pletner | G03F 7/709 |
| | | | | 700/60 |
| 2012/0300579 | A1* | 11/2012 | Larkin | G01N 29/04 |
| | | | | 367/13 |
| 2012/0300580 | A1 | 11/2012 | Underwood et al. | |
| 2013/0300580 | A1* | 11/2013 | Palmieri | G08G 1/161 |
| | | | | 340/901 |

OTHER PUBLICATIONS

Underwood, Marcos A., "Applications of Digital Control Techniques to High Level Acoustic Testing," 31st Aerospace Testing Seminar; Oct. 22-25, 2018; Los Angeles, CA; United States.

Musella et al., "Tackling the target matrix definition in MIMO Random Vibration Control testing," 30th Aerospace Testing Seminar; Mar. 2017; Los Angeles, CA; United States.

Smallwood, David O., "The challenges of multiple input vibration testing and analysis," Presented at the Experimental and Analytical joint HOCWOG, Los Alamos National Labs, May 20, 2013, https://www.osti.gov/servlets/purl/1095931.

Maahs, Gordon, "Direct Field Acoustic Test (DFAT) Development and Flight Testing of Radiation Belt Storm Probe (RBSP) Satellites," 27th Aerospace Testing Seminar; Oct. 16-18, 2012; Los Angeles, CA; United States.

Hughes et al., "The Development of the Acoustic Design of NASA Glenn Research Center's New Reverberant Acoustic Test Facility," 26th Aerospace Testing Seminar; Mar. 29-31, 2011; Los Angeles, CA; United States.

Larkin et al., "Status of Direct Field Acoustic Testing," 27th Aerospace Testing Seminar; Oct. 16-18, 2012; Los Angeles, CA.

Underwood et al., "Some Aspects of using Measured Data as the Basis of a Multi-Exciter Vibration Test," Proceedings of the IMAC-XXVIII, Feb. 1-4, 2010, Jacksonville, Florida USA.

Underwood, Marcos A., "Digital Control Systems for Vibration Testing Machines," Shock and Vibration Handbook, 6th ed., Chapter 26, Edited by Piersol et al., T.L., McGraw-Hill, New York, 2009.

Underwood et al., "MIMO Testing Methodologies," Proceedings of the 79th Shock & Vibration Symposium, Oct. 2008; Orlando, Florida.

Smallwood, David O., "Multiple-Input Multiple-Output (MIMO) linear systems extreme inputs/outputs," Shock and Vibration, vol. 14, No. 2, (2007) pp. 107-132.

Underwood et al., "Rectangular Control of Multi-Shaker Systems; Theory and some practical results," Journal and Proceedings—Institute of Environmental Sciences and Technology, Apr. 2003.

Underwood, Marcos A., "Applications of Computers to Shock and Vibration," Shock and Vibration Handbook, 5th Ed., Chapter 27, Edited by Harris, C. M., and Piersol, A. G., McGraw-Hill, New York, 2001.

Extended European Search Report, EP Application No. 20741958.1, dated Sep. 30, 2012.

Notice of Reasons for Refusal, JP Application No. 2021-541721, dated Sep. 1, 2022.

Examiner Report, CA Application No. 3,127,190, dated Nov. 7, 2022.

* cited by examiner

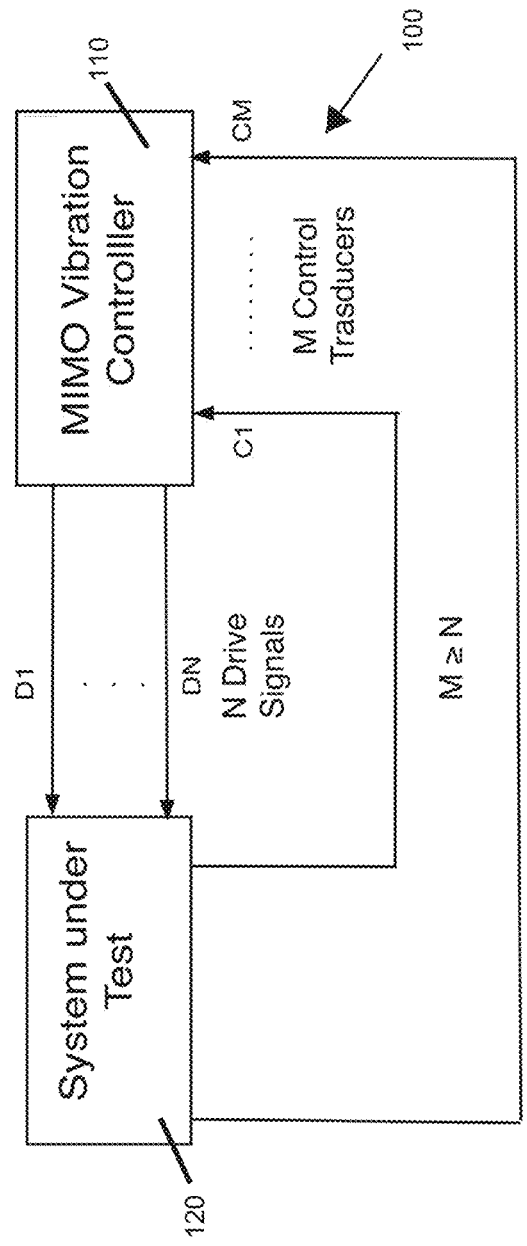
Fig. 1: Block Diagram of Existing MIMO Mechanical and Acoustic Vibration Controller

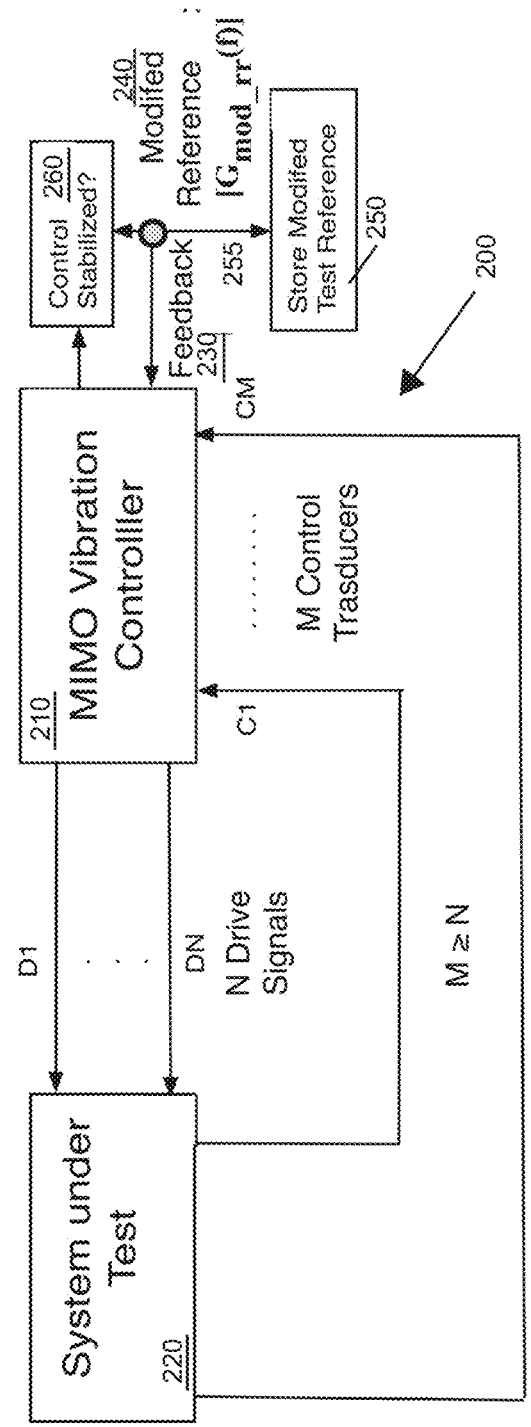
Fig. 2a: Overall Block Diagram of Enhanced MIMO Vibration Controller

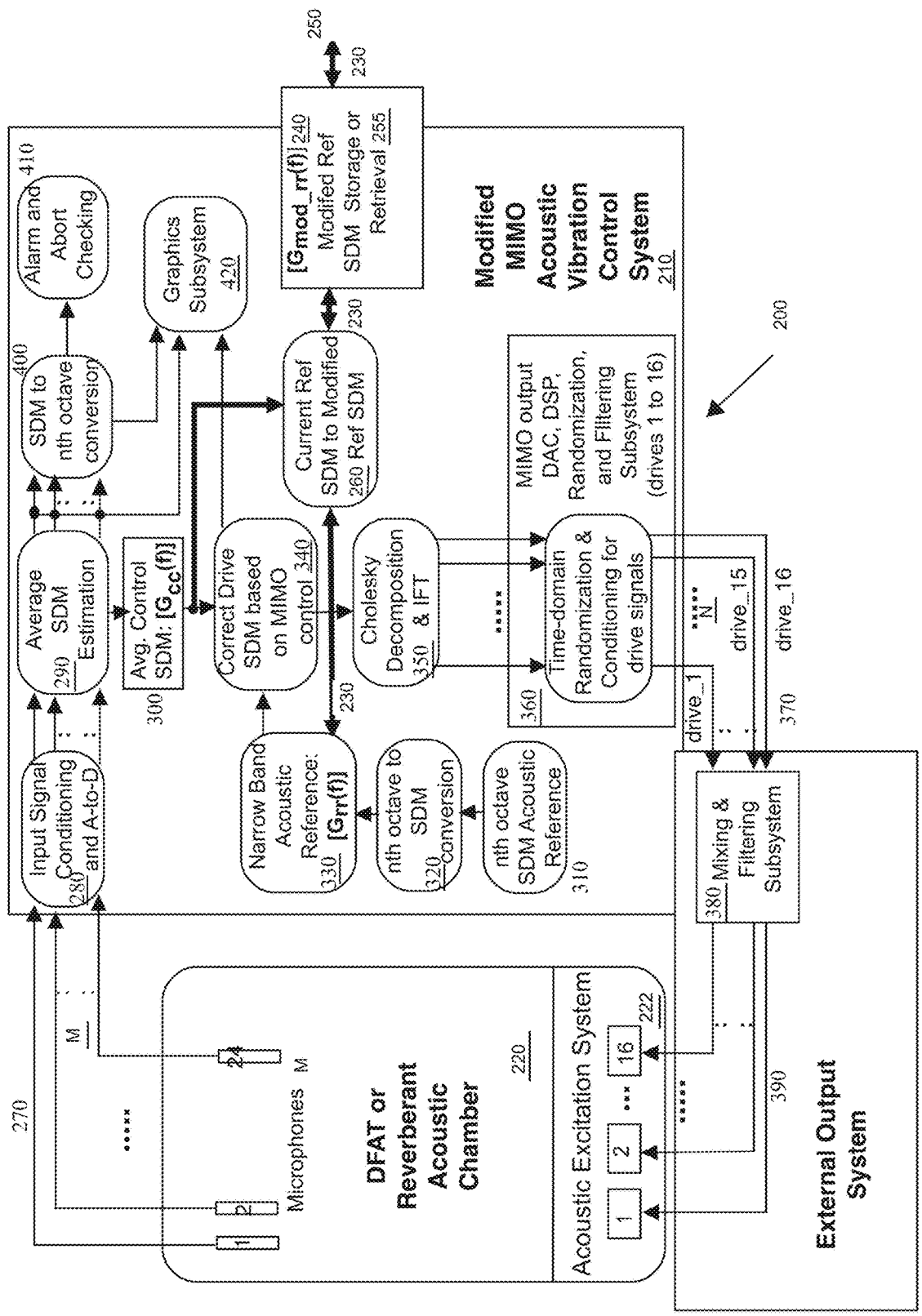
Fig. 2b: Detailed Block Diagram of Representative Enhanced MIMO Acoustic Vibration Controller

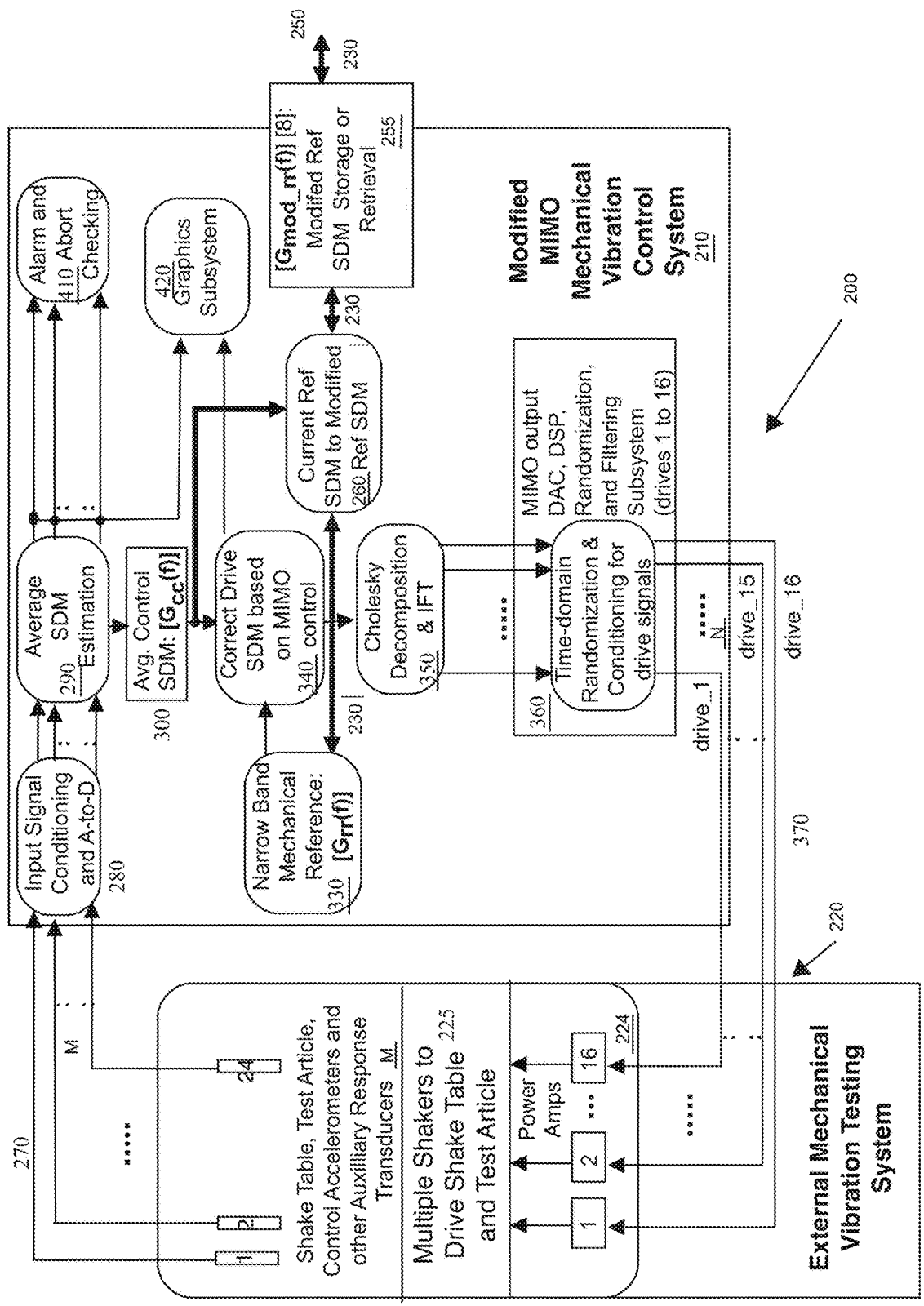
Fig. 2c: Detailed Block Diagram of Representative Enhanced MIMO Mechanical Vibration Controller

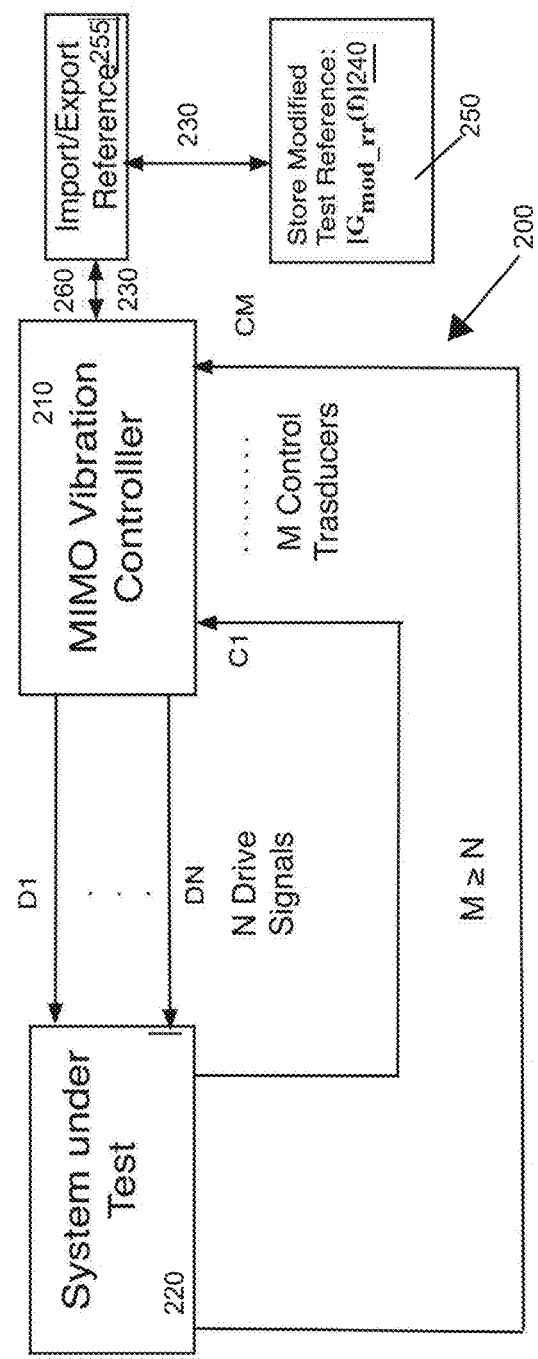
Fig. 3: Overall Block Diagram of retrieval/storage and use of $[G_{mod\_rr}(f)]$ for testing

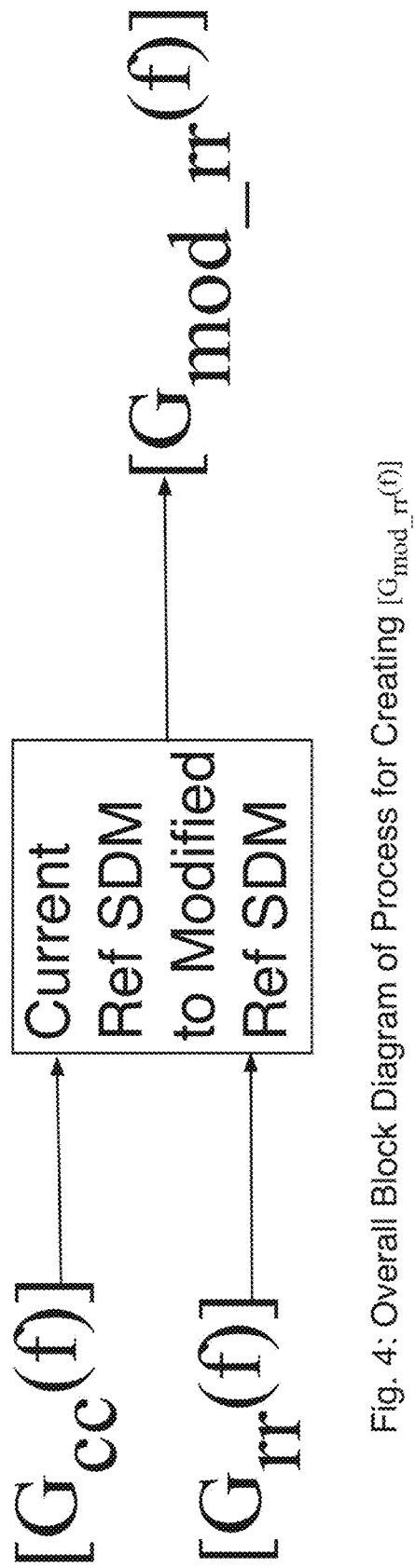
Fig. 4: Overall Block Diagram of Process for Creating $[G_{mod\_rr}(f)]$ $$[G_{rr}(f_k)] = \begin{bmatrix} G_{rr}(1,1,f_k) & \overline{G_{rr}(2,1,f_k)} & \overline{G_{rr}(3,1,f_k)} & \ldots & \overline{G_{rr}(M,1,f_k)} \\ G_{rr}(2,1,f_k) & G_{rr}(2,2,f_k) & \overline{G_{rr}(3,2,f_k)} & \ldots & \overline{G_{rr}(M,2,f_k)} \\ G_{rr}(3,1,f_k) & G_{rr}(3,2,f_k) & G_{rr}(3,3,f_k) & \ldots & \overline{G_{rr}(M,3,f_k)} \\ \vdots & \vdots & \vdots & \ldots & \vdots \\ G_{rr}(M,1,f_k) & G_{rr}(M,2,f_k) & G_{rr}(M,3,f_k) & \ldots & G_{rr}(M,M,f_k) \end{bmatrix}$$

Fig. 5a - Spectral Density Matrix (SDM) for Initial Reference Specification $$[G_{cc}(f_k)] = \begin{bmatrix} G_{cc}(1,1,f_k) & \overline{G_{cc}(2,1,f_k)} & \overline{G_{cc}(3,1,f_k)} & \ldots & \overline{G_{cc}(M,1,f_k)} \\ G_{cc}(2,1,f_k) & G_{cc}(2,2,f_k) & \overline{G_{cc}(3,2,f_k)} & \ldots & \overline{G_{cc}(M,2,f_k)} \\ G_{cc}(3,1,f_k) & G_{cc}(3,2,f_k) & G_{cc}(3,3,f_k) & \ldots & \overline{G_{cc}(M,3,f_k)} \\ \vdots & \vdots & \vdots & \ldots & \vdots \\ G_{cc}(M,1,f_k) & G_{cc}(M,2,f_k) & G_{cc}(M,3,f_k) & \ldots & G_{cc}(M,M,f_k) \end{bmatrix}$$

Fig. 5b - SDM for Actual Measured Response at Control Locations During System Operation Under Conventional MIMO Control $$[G_{mod\_rr}(f_k)] = \begin{bmatrix} G_{rr}(1,1,f_k) & \overline{G_{mod\_rr}(2,1,f_k)} & \overline{G_{mod\_rr}(3,1,f_k)} & \ldots & \overline{G_{mod\_rr}(M,1,f_k)} \\ K_{21k}G_{cc}(2,1,f_k) & G_{rr}(2,2,f_k) & \overline{G_{mod\_rr}(3,2,f_k)} & \ldots & \overline{G_{mod\_rr}(M,2,f_k)} \\ K_{31k}G_{cc}(3,1,f_k) & K_{32k}G_{cc}(3,2,f_k) & G_{rr}(3,3,f_k) & \ldots & \overline{G_{mod\_rr}(M,3,f_k)} \\ \vdots & \vdots & \vdots & \ldots & \vdots \\ K_{M1k}G_{cc}(M,1,f_k) & K_{M2k}G_{cc}(M,2,f_k) & K_{M3k}G_{cc}(M,3,f_k) & \ldots & G_{rr}(M,M,f_k) \end{bmatrix}$$

Fig. 5c - Calculation of Modified Reference SDM where Lines=the number of spectral lines and M is the number of rows in the SDM

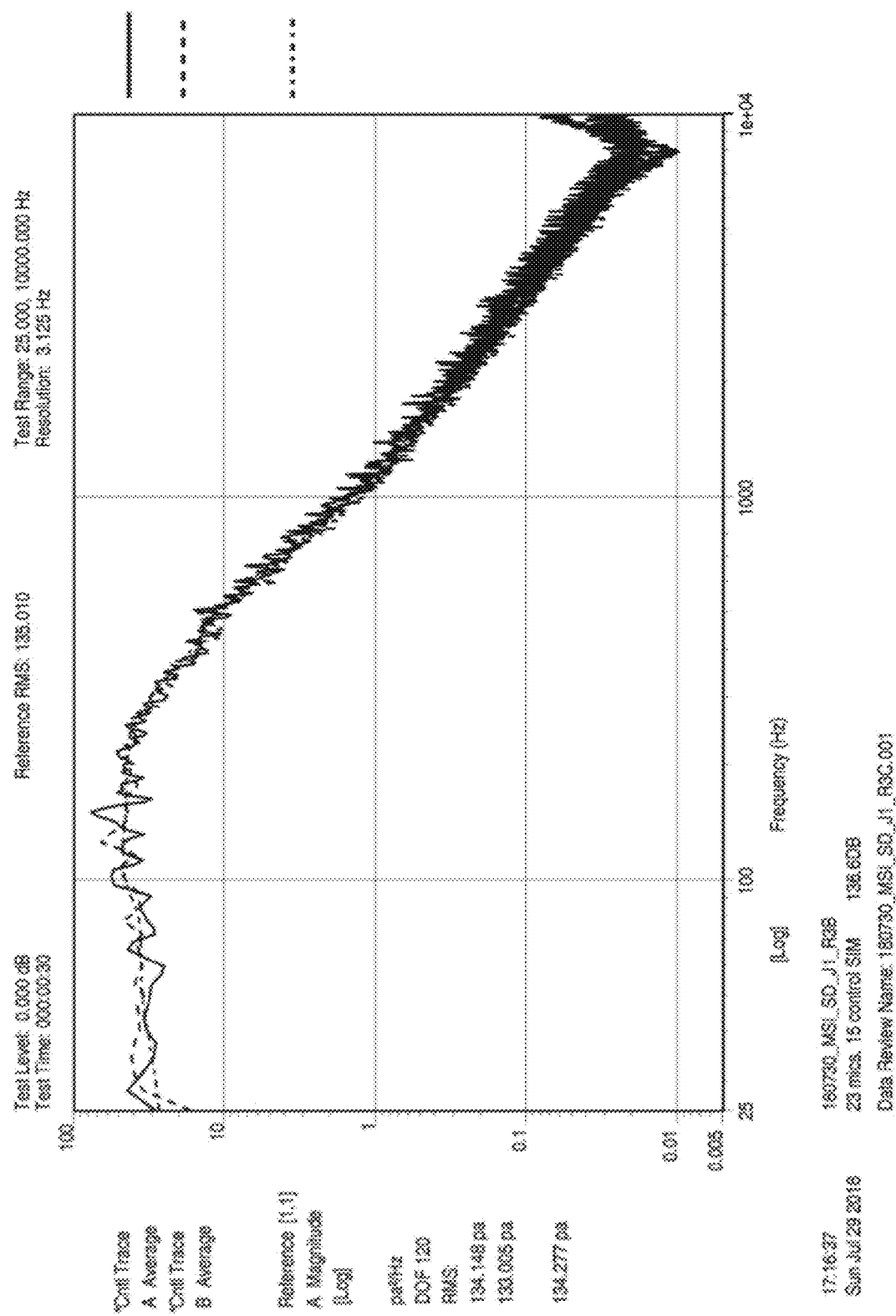
Fig. 6a: Comparison of control averages using mixer+unmodified (solid) and mixer+modified control (dash)

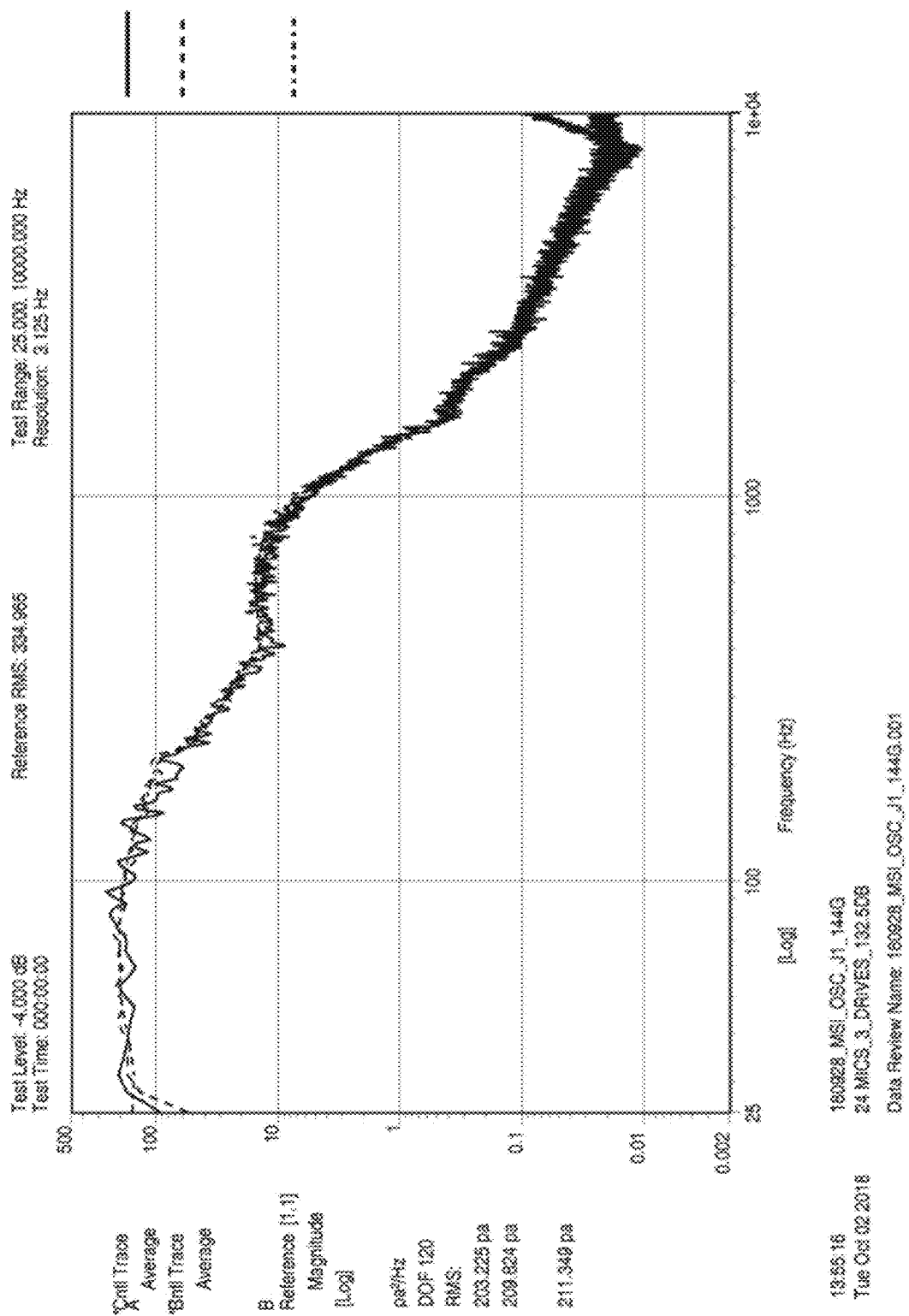
Fig. 6b: Comparison of control averages using mixer+unmodified (solid) and rectangular+modified control (dash)

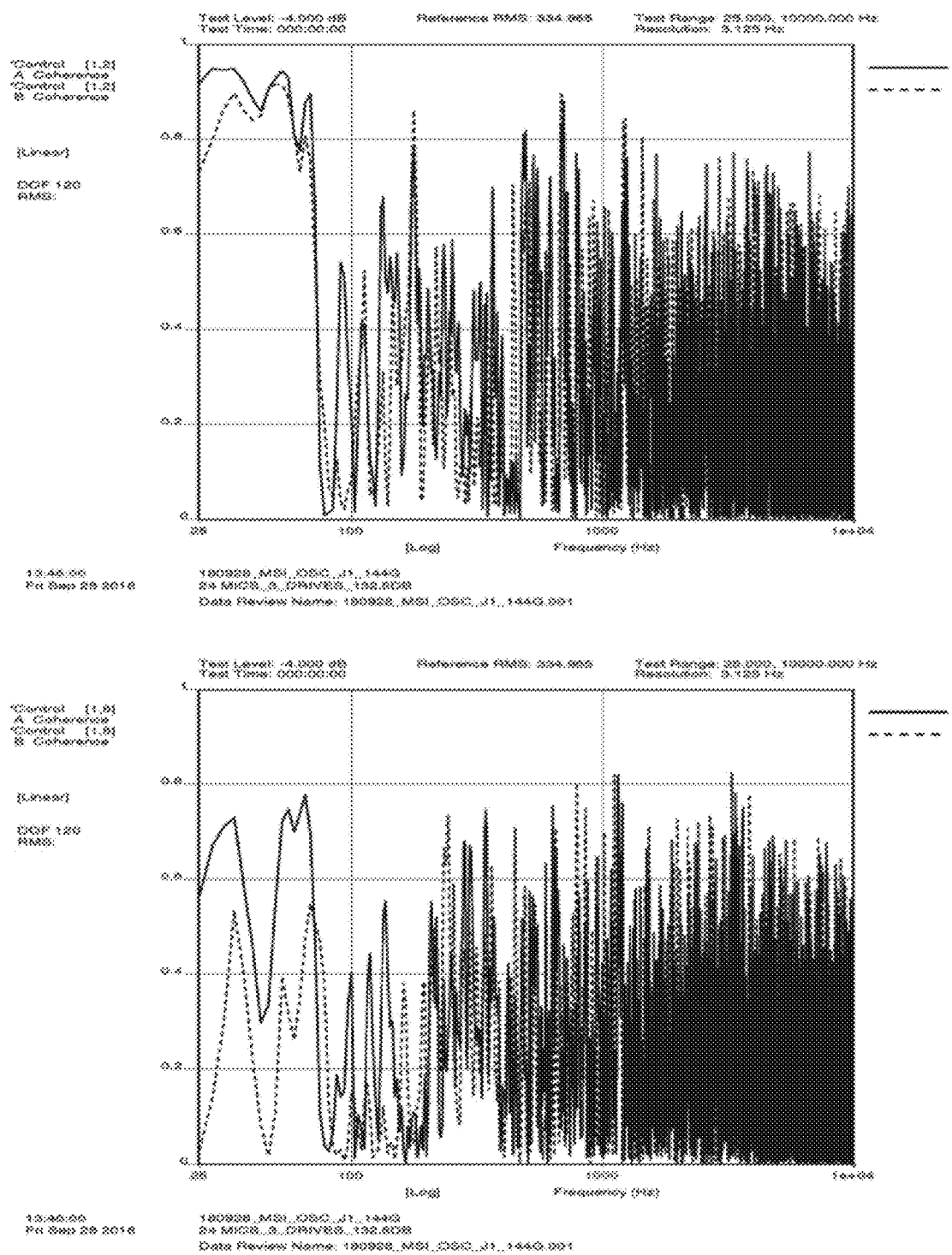
Fig. 6c: Achieved Coherence Spectra Comparison Between Mixer (A) or Modified (B) Rectangular Control

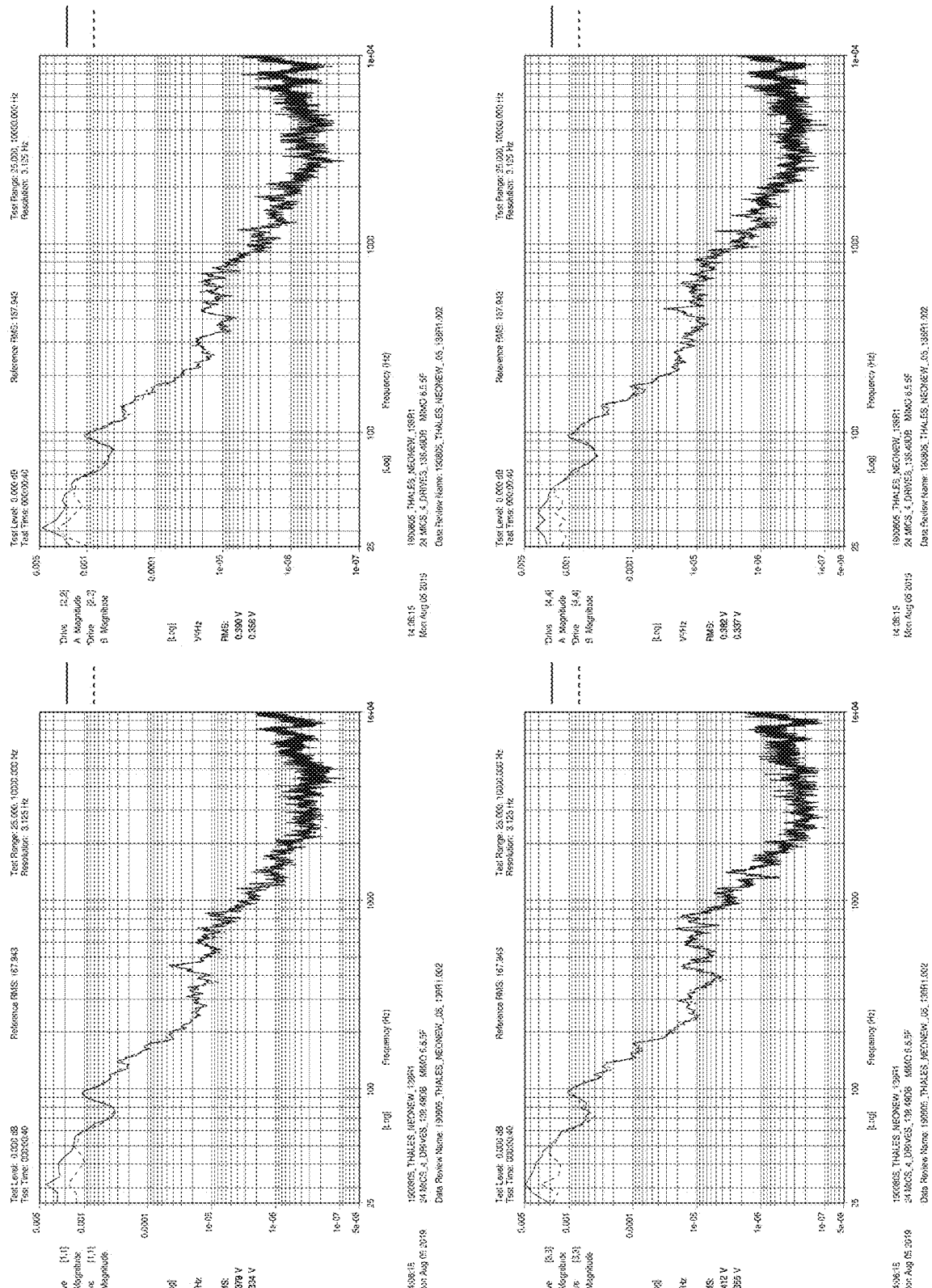
Fig. 7: Example of Required System Drive Reduction by Using Manually Modified Predetermined Initial Reference Specification

HIGH INTENSITY VIBRATION TESTING USING AN EMPIRICALLY MODIFIED REFERENCE SPECIFICATION AND METHOD THEREOF

FIELD OF THE INVENTION

The present invention relates generally to the field of vibration testing of objects such as satellites, instrumentation or any other object whose reliability in operation may be evaluated using high intensity vibration testing. Specifically, the present invention relates to the use of either: direct field or reverberant chamber (acoustic) testing systems; or multiple-exciter (where an exciter can either be an electro-hydraulic actuator, electro-dynamic shaker, ceramic shaker, or collections of such vibration transducers) (mechanical) testing systems to perform vibration testing. The present invention further relates to controls to enable acoustic testing systems to produce an acoustic field conforming to a predetermined initial reference specification and mechanical testing systems to produce vibration responses conforming to a predetermined initial reference specification.

BACKGROUND OF THE INVENTION

In the fields of acoustic vibration testing, it is desirable to control numerous parameters of the acoustic response field or the response vibrations according to a predetermined reference specification. In a typical MIMO DFAT control system 100, as described in U.S. Pat. No. 9,109,972 [3], which is incorporated by reference herein in its entirety, and also shown by the herein included FIG. 1, a reference specification is typically provided that contains the desired predetermined acoustic field parameters. During operation the system will make adjustments to the drive signals for multiple groups of independently controllable transducers so that the resulting acoustic field will match as closely as possible the predetermined acoustic field specifications contained in the reference (i.e., the predetermined reference specification). However, the predetermined acoustic field specifications typically ignore the real-world constraints of the test system, its components and the test facility itself. For example, and not by way of limitation, the predetermined acoustic field specification may contain relative coherence values in its off-diagonal elements, which cannot be achieved due to physical limitations in the test system, which are thereby ignored. As a result, during operation, adjustments to the drive signals may fail to yield an acceptable test response and may exceed the capabilities of the system leading to self-limiting by components of the test system with the potential for damage to the system components or the test article itself.

Similarly, in the field of mechanical vibration testing, it is also desirable to control numerous parameters of the mechanical vibration test according to a predetermined reference specification. In a typical Multiple Input Multiple Output (MIMO) mechanical vibration test control system 100, as described in FIG. 2 of U.S. Pat. No. 5,299,459 [15], which is incorporated by reference herein in its entirety, and also by the herein included FIG. 1, a reference specification is typically provided that contains the desired predetermined mechanical vibration test parameters. During operation of the system 100, by way of example and not of limitation, a MIMO mechanical vibration controller 110 will make adjustments to the drive signals for multiple groups of separately controllable exciters so that the resulting mechanical vibration test responses will match as closely as possible the predetermined mechanical vibration test specifications contained in the reference specification (i.e. the predetermined reference specification). However, the predetermined mechanical vibration test specifications also typically ignore the real-world constraints of the test system and its components, as in the example provided above with respect to acoustic testing. As a result, during operation, adjustments to the drive signals may exceed the capabilities of the mechanical vibration test system leading to self-limiting by components of the test system, failure to meet the specified test parameters and possible damage to the system components or the test article itself.

In either mechanical or acoustic MIMO vibration control systems, the degree to which the actual test conditions fail to meet the specified test parameters depends on many factors including, by way of example and not of limitation, the real-world constraints imposed by the system's maximum output capabilities, non-linear response characteristics and/or time variability in test systems characteristics, limitations of the transducers or exciters employed, as well as constraints imposed by the MIMO vibration test facility and/or associated limitations of the MIMO vibration control system itself. These limitations may, collectively, contribute to substantial discrepancies between the actual test response and the specified test parameters leading to unreliable test results, excessive system drive power being required, damage to the system components or damage to the test article itself through "over-testing", in attempts by the MIMO vibration control system to overcome these limitations.

Methods such as those described in [2, 4, 8, 9, 10, 11, 12, 13, 14, 15, 16] have mainly focused on establishing limits to prevent the test system from damaging itself or from damaging the test article. Those skilled in the art will be familiar with various methods for implementing limiters including establishment of maximum safe levels for drive signals and feedback to system limiters from test article instrumentation. Although these limiters do reduce the risk of test system damage and some forms of over-testing, they also significantly reduce the maximum capability of the testing system and facility and fail to make any adjustments to the initial test specification to accommodate the actual performance limitations of the test system and facility.

Accordingly it would be advantageous to provide MIMO acoustic or mechanical vibration control systems with the ability to modify the predetermined reference specification, for either conventional square control or rectangular control [12], according to an empirically determined set of compromises based on the collective limitations of a particular test setup. By using the modified reference specification during actual test operation, an improved match between the test system response and the predetermined reference specification is achieved with less required system drive power, increased overall capability, and reduced risk of damage to the system components or test article regardless of which MIMO vibration control methodology is employed.

REFERENCES

1. Underwood, Marcos A., "*Applications of Digital Control Techniques to High Level Acoustic Testing,*" 31*st Aerospace Testing Seminar;* 22-25 Oct. 2018; Los Angeles, Calif.; United States
2. Musella et al., "*Tackling the target matrix definition in MIMO Random Vibration Control testing,*" 30*th Aerospace Testing Seminar;* March 2017; Los Angeles, Calif.; United States 3. Larkin et al., "Direct Field Acoustic Test System and Method," U.S. Pat. No. 9,109,972, Aug. 18, 2015.
4. Smallwood, David O., "*The challenges of multiple input vibration testing and analysis,*" Presented at the Experimental and Analytical joint HOCWOG, Los Alamos National Labs, May 20, 2013, https://www.osti.gov/servlets/purl/1095931
5. Larkin et al., "*Status of Direct Field Acoustic Testing,*" 27th Aerospace Testing Seminar; 16-18 Oct. 2012; Los Angeles, Calif.
6. Maahs, Gordon, "*Direct Field Acoustic Test (DFAT) Development and Flight Testing of Radiation Belt Storm Probe (RESP) Satellites,*" 27th Aerospace Testing Seminar; 16-18 Oct. 2012; Los Angeles, Calif.; United States
7. Hughes et al., "*The Development of the Acoustic Design of NASA Glenn Research Center's New Reverberant Acoustic Test Facility,*" 26th Aerospace Testing Seminar; 29-31 Mar. 2011; Los Angeles, Calif.; United States
8. Underwood et al., "*Some Aspects of using Measured Data as the Basis of a Multi-Exciter Vibration Test,*" Proceedings of the IMAC-XXVIII, Feb. 1-4, 2010, Jacksonville, Fla. USA
9. Underwood, Marcos A., "*Digital Control Systems for Vibration Testing Machines,*" Shock and Vibration Handbook, 6th ed., Chapter 26, Edited by Piersol et al., T L., McGraw-Hill, New York, 2009
10. Underwood et al., "*MIMO Testing Methodologies,*" Proceedings of the 79th Shock & Vibration Symposium, October 2008; Orlando, Fla.
11. Smallwood, David O., "*Multiple-Input Multiple-Output (MIMO) linear systems extreme inputs/outputs,*" Shock and Vibration, Vol. 14, No. 2, (2007) pp 107-132.
12. Underwood et al., "*Rectangular Control of Multi-Shaker Systems; Theory and some practical results,*" Journal and Proceedings—Institute of Environmental Sciences and Technology, April 2003
13. Underwood, Marcos A., "*Applications of Computers to Shock and Vibration,*" Shock and Vibration Handbook, 5th Ed., Chapter 27, Edited by Harris, C. M, and Piersol, A. G., McGraw-Hill, New York, 2001
14. Underwood, Marcos A., *Adaptive Control Method and System for Transient Waveform Testing.* U.S. Pat. No. 5,517,426, May 14, 1996.
15. Underwood, Marcos A., *Adaptive Control Method and System for MultiExciter Swept-Sine Testing.* U.S. Pat. No. 5,299,459, Apr. 5, 1994.
16. Underwood, Marcos A., Digital Signal Synthesizer Method and System, U.S. Pat. No. 4,782,324, Nov. 1, 1988.

BRIEF SUMMARY OF THE INVENTION

Embodiments hereof include an acoustic or mechanical vibration testing system including a MIMO control system coupled to at least two separately controllable groups of vibration transducers and at least two control sensor transducers wherein the number of control sensor transducers need not be equal to the number of controller output drives or number of separately controllable groups of vibration transducers. The MIMO control system utilizes both a predetermined initial reference specification and a modified reference specification, wherein data acquired during system operation under conventional MIMO control is used to create the modified reference specification based on actual system performance and limitations thereof so as to maintain closer correspondence to the predetermined initial reference specification (predetermined initial acoustic field specification or predetermined initial mechanical vibration specification) with less required system drive power, as a function of the predetermined initial reference, and less risk of damage to the test system and the test article during the performance of a test.

Embodiments hereof also include an acoustic or mechanical vibration testing system including a MIMO control system coupled to at least two separately controllable groups of vibration transducers and at least two control sensor transducers wherein the number of control sensor transducers need not be equal to the number of controller output drives or number of separately controllable groups of vibration transducers. The MIMO control system utilizes both a predetermined initial reference specification and a modified reference specification, wherein an iterative feedback process, which can either be manually by user or automatically by calculation, is used to create the modified reference specification based on actual system performance and limitations thereof so as to maintain closer correspondence to the predetermined initial reference specification (predetermined initial acoustic field specification or predetermined initial mechanical vibration specification) with less required system drive power, as a function of the predetermined initial reference, and less risk of damage to the test system and the test article during the performance of a test.

Embodiments hereof also include an acoustic or mechanical vibration testing system including a MIMO control system coupled to at least two separately controllable groups of vibration transducers and at least two control sensor transducers wherein the number of control sensor transducers need not be equal to the number of controller output drives or number of separately controllable groups of vibrations transducers. The MIMO control system utilizes both a predetermined initial reference specification and a modified reference specification wherein data acquired during system operation under conventional MIMO control is used to create the modified reference specification based on actual system performance and limitations thereof and wherein the modified reference specification is stored using a suitable data recording device so as to be available for future use as a reference specification by similar test system arrangements so as to maintain closer correspondence to the predetermined initial reference specification (predetermined initial acoustic field specification or predetermined initial mechanical vibration specification) with less required system drive power, as a function of the predetermined initial reference, and less risk of damage to the test system and the test article during the performance of a test.

Embodiments hereof also include an acoustic or mechanical vibration testing system including a MIMO control system coupled to at least two separately controllable groups of vibration transducers and at least two control sensor transducers wherein the number of control sensor transducers need not be equal to the number of controller output drives or the number of separately controllable groups of vibration transducers. The MIMO control system utilizes both a predetermined initial reference specification and a modified reference specification wherein data acquired during system operation under conventional MIMO control is used to create the modified reference specification based on actual system performance and limitations thereof and wherein a loader is used for loading a previously stored modified reference from a storage device to replace the predetermined initial reference specification during actual testing so as to maintain closer correspondence to the predetermined initial reference specification (predetermined initial acoustic field specification or predetermined initial mechanical vibration specification) with less required system drive power, as a function of the predetermined initial reference, and less risk of damage to the test system and the test article during the performance of a test.

Embodiments hereof also include an acoustic or mechanical vibration testing system comprising a MIMO control system coupled to at least two separately controllable groups of vibration transducers and at least two control sensor transducers wherein the number of control sensor transducers need not be equal to the number of controller output drives or the number of separately controllable groups of vibration transducers. The MIMO control system utilizes both a predetermined initial reference specification and a modified reference specification wherein data acquired during system operation under conventional MIMO control is used to create the modified reference specification based on actual system performance and limitations thereof and wherein a previously stored modified reference is used to replace the predetermined initial reference specification and an iterative feedback process is used to further modify the previously stored modified reference specification and the further modified reference specification is used during actual testing so as to maintain closer correspondence to the predetermined initial reference specification (predetermined initial acoustic field specification or predetermined initial mechanical vibration specification) with less required system drive power, as a function of the predetermined initial reference, and less risk of damage to the test system and the test article during the performance of a test.

Embodiments hereof also include an acoustic or mechanical vibration testing system including a MIMO control system coupled to at least two separately controllable groups of vibration transducers and at least two control sensor transducers wherein the number of control sensor transducers need not be equal to the number of controller output drives or the number of separately controllable groups of vibration transducers. The MIMO control system utilizes both a predetermined initial reference specification and a modified reference specification wherein the modified reference specification includes modifications to account for anomalies due to placement of the separately controllable groups of vibration transducers or control sensor transducers, or instrumentation errors such as, by way of example and not of limitation, poor phase and amplitude matching between input channels, low coherence between the separately controllable vibration transducer drive vectors and control point response vectors, and dynamic range limitations of the controller input and output channels so as to maintain closer correspondence to the predetermined initial reference specification (predetermined initial acoustic field specification or predetermined initial mechanical vibration specification) with less required system drive power, as a function of the predetermined initial reference, and less risk of damage to the test system and the test article during the performance of a test.

Embodiments hereof also include an acoustic or mechanical vibration testing system including a MIMO control system coupled to at least two separately controllable groups of vibration transducers and at least two control sensor transducers wherein the number of control sensor transducers need not be equal to the number of controller output drives or number of separately controllable groups of vibration transducers. The MIMO control system utilizes both a predetermined initial reference specification and a modified reference specification wherein the modified reference specification includes modifications to account for anomalies due to nonlinear and time variant characteristics of the acoustic field so as to maintain closer correspondence to the predetermined initial reference specification (predetermined initial acoustic field specification or predetermined initial mechanical vibration specification) with less required system drive power, as a function of the predetermined initial reference, and less risk of damage to the test system and the test article during the performance of a test.

Embodiments hereof also include an acoustic or mechanical vibration testing system including a MIMO control system coupled to at least two separately controllable groups of vibration transducers and at least two control sensor transducers wherein the number of control sensor transducers need not be equal to the number of controller output drives or number of separately controllable groups of vibration transducers. The MIMO control system utilizes both a predetermined initial reference specification and a modified reference specification wherein data acquired during system operation under conventional MIMO control is used to create the modified reference specification based on actual system performance and limitations thereof and wherein the modifications to the predetermined initial reference specification do not change the diagonal elements (spectral reference vector) of the predetermined initial reference specification matrix (SDM) so as to maintain closer correspondence to the predetermined initial reference specification (predetermined initial acoustic field specification or predetermined initial mechanical vibration specification) with less required system drive power, as a function of the predetermined initial reference, and less risk of damage to the test system and the test article during the performance of a test.

Embodiments hereof also include an acoustic or mechanical vibration testing system including a MIMO control system coupled to at least two separately controllable groups of vibration transducers and at least two control sensor transducers wherein the number of control sensor transducers need not be equal to the number of controller output drives or number of separately controllable groups of vibration transducers. The MIMO control system utilizes both a predetermined initial reference specification and a modified reference specification wherein data from actual control sensor responses during system operation under conventional MIMO control is used to further modify a previously modified reference specification based on actual system performance and limitations thereof so as to maintain closer correspondence to the predetermined initial reference specification (predetermined initial acoustic field specification or predetermined initial mechanical vibration specification) with less required system drive power, as a function of the predetermined initial reference, and less risk of damage to the test system and the test article during the performance of a test.

Embodiments hereof also include an acoustic or mechanical vibration testing system including a MIMO control system coupled to at least two separately controllable groups of vibration transducers and at least two control sensor transducers wherein the number of control sensor transducers need not be equal to the number of controller output drives or number of separately controllable groups of vibration transducers. The MIMO control system utilizes both a predetermined initial reference specification and a modified reference specification wherein data acquired during system operation under conventional MIMO control is used to create a modified reference specification based on actual system performance and limitations thereof in such a way that the resulting matrix describing the modified reference specification is both at least positive semi-definite and Hermitian so as to maintain closer correspondence to the predetermined initial reference specification (predetermined initial acoustic field specification or predetermined initial mechanical vibration specification) with less required system drive power, as a function of the predetermined initial reference, and less risk of damage to the test system and the test article during the performance of a test.

Embodiments hereof also include an acoustic or mechanical vibration testing system including a MIMO control system coupled to at least two separately controllable groups of vibration transducers and at least two control sensor transducers wherein the number of control sensor transducers need not be equal to the number of controller output drives or number of separately controllable groups of vibration transducers. The MIMO control system utilizes a predetermined initial reference specification, expressed as a spectral density matrix $[G_{rr}(f)]$, measured control location responses during operation under conventional MIMO control represented by a spectral density matrix $[G_{cc}(f)]$, and a modified reference specification expressed as a modified spectral density matrix $[G_{mod\_rr}(f)]$, wherein the diagonal elements of the modified spectral density matrix $[G_{mod\_rr}(f)]$ are the same as in $[G_{rr}(f)]$ and wherein each of the below diagonal elements of $[G_{mod\_rr}(f)]$ are equal to the below diagonal elements of $[G_{cc}(f)]$ multiplied by a factor, $[K_{ijk}]$, which is a ratio that is representative of the product between each control location pair implied by the predetermined initial reference specification divided by the product between each control location pair implied by the actual measured control location responses during low level operation, and wherein the above diagonal rows of $[G_{mod\_rr}(f)]$ are equal to the corresponding transposed complex conjugates of the below diagonal columns (whose elements have reversed column-row indices) thereby incorporating the real world performance characteristics of the test system and facility into the test specification so as to maintain closer correspondence to the predetermined initial reference specification (predetermined initial acoustic field specification or predetermined initial mechanical vibration specification) with less required system drive power, as a function of the predetermined initial reference, and less risk of damage to the test system and the test article during the performance of a test.

Embodiments hereof also include an acoustic or mechanical vibration testing system including a MIMO control system coupled to at least two separately controllable groups of vibration transducers and at least two control sensor transducers wherein the number of control sensor transducers need not be equal to the number of controller output drives or number of separately controllable groups of vibration transducers. The MIMO control system utilizes a predetermined initial reference specification, which has been manually modified, using its existing predetermined initial reference specification entry software, expressed as a spectral density matrix $[G_{rr}(f)]$, wherein some or all of its off-diagonal elements are chosen to have their equivalent coherence values increased "slightly," e.g. typically by adding 0.005 to 0.05 to their original values or some other small quantity that the test engineer considers a tolerable modification of the off-diagonal elements of the predetermined initial reference specification consistent with the overall specified test tolerances, to reduce the required drive power over a chosen frequency range, which are typically the lowest frequencies, more than possible with the same system/method without using the manually modified predetermine initial reference specification, at the expense of tolerable losses in subsequent control accuracy, where typically the larger the increase in coherence the larger the loss in control accuracy. Utilizing this thus manually modified predetermined initial reference specification $[G_{rr}(f)]$, the MIMO control system also utilizes measured control location responses during operation under conventional MIMO control represented by a spectral density matrix $[G_{cc}(f)]$, and a modified reference specification expressed as a modified spectral density matrix $[G_{mod\_rr}(f)]$, wherein the diagonal elements of the modified spectral density matrix $[G_{mod\_rr}(f)]$ are the same as in $[G_{rr}(f)]$ and wherein each of the below diagonal elements of $[G_{mod\_rr}(f)]$ are equal to the below diagonal elements of $[G_{cc}(f)]$ multiplied by a factor, $[K_{ijk}]$, which is a ratio that is representative of the product between each control location pair implied by the predetermined initial reference specification divided by the product between each control location pair implied by the actual measured control location responses during low level operation, and wherein the above diagonal rows of $[G_{mod\_rr}(f)]$ are equal to the corresponding transposed complex conjugates of the below diagonal columns thereby incorporating the real world performance characteristics of the test system and facility into the test specification so as to maintain closer correspondence to the predetermined initial reference specification (predetermined initial acoustic field specification or predetermined initial mechanical vibration specification) with a greater reduction in required system drive power, as a function of the modifications to the predetermined initial reference, and less risk of damage to the test system and the test article during the performance of a test.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

FIG. 1 is a simplified block diagram of typical MIMO vibration testing systems for acoustic or mechanical testing.

FIG. 2a is a simplified block diagram of an enhanced MIMO vibration testing systems for acoustic or mechanical testing in accordance with embodiments of the present invention.

FIG. 2b is a detailed block diagram of an enhanced MIMO vibration testing system for acoustic vibration testing in accordance with embodiments of the present invention.

FIG. 2c is a detailed block diagram of an enhanced MIMO vibration testing system for mechanical vibration testing in accordance with embodiments of the present invention.

FIG. 3 is a simplified block diagram of an enhanced MIMO Acoustic or Mechanical Vibration Testing System similar to that shown in FIG. 2a in accordance with the present invention which shows the use of a previously stored modified reference specification from a previous test run to replace the current or predetermined initial reference specification or to be further modified via the feedback process shown in FIG. 2a.

FIG. 4 shows a block diagram of how the current reference spectral density matrix (SDM), $[G_{rr}(f)]$, and the current control-response SDM, $[G_{cc}(f)]$, using either conventional or rectangular control, are used to produce the Modified reference SDM: $[G_{mod\_rr}(f)]$, either using feedback from a previously Modified Reference SDM or the predetermined initially specified Reference SDM as shown by FIGS. 2a, 2b, 2c, and FIG. 3.

FIG. 5a shows an example of a spectral density matrix (SDM), $[G_{rr}(f)]$, representing the predetermined initial reference specification for a test.

FIG. 5b shows an example of an SDM, $[G_{cc}(f)]$, representing the actual measured responses at the control locations during operation at a level substantially below the full test level once a stable operating configuration is achieved.

FIG. 5c shows the detailed calculations of how the elements of the modified reference SDM, $[G_{mod\_rr}(f_k)]$, are obtained.

FIG. 6a shows a comparison of the average of the diagonal elements of the control-response SDM, $[G_{cc}(f)]$, obtained with an unmodified MIMO Acoustic Vibration Controller using a Mixer to achieve rectangular control in conjunction with certain MIMO controllers that operate with square control, but with provisions for the Mixer, as described in U.S. Pat. No. 9,683,912 B2, which is incorporated by reference herein in its entirety, shown by its solid traces, and with an enhanced MIMO Acoustic Vibration Controller also using a mixer, shown by its dashed traces, as in FIG. 2b.

FIG. 6b shows a comparison of the average of the diagonal elements of the control-response SDM, $[G_{cc}(f)]$, obtained with an unmodified MIMO Acoustic Vibration Controller, during another test, using a mixer to achieve rectangular control in conjunction with certain MIMO controllers that operate with square control, but with provisions for the mixer shown by its solid trace, as in FIG. 6a, and with an enhanced MIMO Acoustic Vibration Controller, but this time using rectangular control and no mixer, to show the improvement in the control performance that the invention further provides, shown by its dashed trace.

FIG. 6c shows a comparison of the achieved relative control-response coherence showing improvements in the achieved coherence control performance of embodiments of the present invention, where again the comparison is shown, as in FIG. 6a, with a similar use of the solid and dashed trace.

FIG. 7 shows a comparison of the required system drive power, in the form of PSDs for each of 4 drives, between two runs of the same general DFAT test, where the first run uses a modified reference specification obtained with an unmodified predetermined initial reference specification shown by the solid trace, and where the second run uses a modified reference specification obtained with a manually modified predetermined initial reference specification shown by the dashed trace.

DETAILED DESCRIPTION OF THE INVENTION

Embodiments hereof are now described with reference to the Figures where like reference characters/numbers indicate identical or functionally similar elements. While specific configurations and arrangements are discussed, it should be understood that this is done for illustrative purposes only. A person with ordinary skill in the relevant art will recognize that other configurations and arrangements can be used without departing from the spirit and scope of the invention.

Referring to FIG. 2a and FIG. 3, a simplified block diagram of an enhanced MIMO vibration testing system 200 in accordance with one embodiment of the present invention is shown. Referring to FIG. 2a, the MIMO vibration testing system 200 includes a conventional MIMO Vibration Controller 210, a System Under Test 220, a control feedback loop 230, computing means for developing a modified or updated reference specification 240, and storage means for storing the modified or updated reference specification 250. Referring to FIG. 2a, as will be understood by those with ordinary skill in the art, the System Under Test 220 includes at least a device under test (DUT), a physical test environment, groups of mechanical or acoustic vibration transducers for providing excitation for the DUT, and control sensor transducers for monitoring the performance of the system. Referring again to FIG. 2a, the MIMO Vibration Controller 210 has a number of inputs for receiving signals from control sensor transducers M located in the System Under Test 220. The number of inputs M may be any number greater than or equal to two, but is typically between four and twenty-four. The control sensor transducers in the System Under Test 220 may be control microphones in an acoustic testing system, shake table or test article control accelerometers in a mechanical testing system, or other control sensors that measure response to the drives. The MIMO Vibration Controller 210 also has a number of outputs or drives N, for providing drive signals to the separately controllable groups of acoustic or mechanical vibration transducers located in the System Under Test 220. The number of outputs or drives N may be any number greater than or equal to two but is typically between four and sixteen. Further, the number of outputs N is less than or equal to the number of inputs M. As will be understood by those with ordinary skill in the art, the number of inputs from the control sensor transducers M will be equal to the number of drives N for conventional square MIMO control, whereas the number of inputs from the control sensor transducers M will be greater than the number of outputs or drives N for rectangular MIMO control. Either square or rectangular MIMO control may be used with the present invention. The control feedback loop 230 may be incorporated into the MIMO Vibration Controller 210 and provides feedback signals to the MIMO Vibration Controller 210 based on a comparison of the signals from the control sensor transducers M received by the MIMO Vibration Controller 210 to a predetermined initial reference specification during operation of the system 200 at a level substantially lower than a full test level. The term "substantially lower than a full test level" means between 6 dB (½ of full level) and 24 dB (1/16 of full level) below full test level, where "full-test level" is the maximum sound pressure level for acoustic, typically in SPL units, or the maximum vibration level for mechanical, typically in Grms units, during a vibration pre-test as defined by the predetermined initial reference specification. Providing the feedback signals during operation of the system 200 at a level substantially below the full test level enables the determination of when the system has arrived at a stable operating configuration wherein the differences between the actual measured responses of the control sensor transducers M and the predetermined initial reference specification fall below the operator specified preset thresholds or wherein observation indicates that further operation is unlikely to produce significantly better correspondence between the control sensor transducer signals M and the predetermined initial reference specification. Once the stable operating configuration is achieved, the modified or updated reference specification 240 is created as discussed below and stored in the modified reference specification storage 250. The modified reference specification storage 250 may be any applicable storage medium, such as a Hard Drive or Solid State drive, used within conventional computer systems.

Referring to FIG. 2b, by way of example and not of limitation, a more detailed diagram of an enhanced MIMO vibration testing system 200 for acoustic testing in accordance with embodiments of the present invention is shown. Blocks with reference numbers the same as other Figures are the same and perform the same functions as previously described. In the example shown in FIG. 2b, the system under test includes 16 acoustic transducers 222 and 24 microphones M as the control sensor transducers described above. However, as described above, there may be more or fewer acoustic transducers 222 and control microphones M. The enhanced MIMO vibration testing system 200 described in FIG. 2b functions as described previously in the description of simplified diagram FIG. 2a. However, as will be understood by those with ordinary skill in the art, the enhanced MIMO testing system shown in FIG. 2b is specifically configured for acoustic testing and includes a mixing and filtering subsystem 380 such as is disclosed in U.S. Pat. No. 9,683,912, which is incorporated by reference herein in its entirety, but where the mixing could be implemented more simply by a signal distribution subsystem and the filtering could be incorporated within the loud-speakers. As will also be understood by those with ordinary skill in the art the mixing of N output drives 370 to deliver a smaller number of unique drive signals 390 to the acoustic transducers 222 can be used as part of an implementation of rectangular control within a MIMO control system capable compensating for the effects of reducing the number of unique drives 390. The reference numbers 270, 280, 290, and 300 identify the processing blocks needed to measure the control response SDM [$G_{cc}(f)$] 300. The reference numbers 340, 350, 360, and 370 identify the processing blocks used to create the MIMO control system's 200 16 output-drives 370. The reference numbers 310, 320, and 330 identify the processing blocks used to create the control reference SDM [$G_{rr}(f)$] 330. The reference numbers 400 and 410 are blocks for the creation of the nth octave version of [$G_{cc}(f)$] 400 and its alarm and error checking block 410. The graphics subsystem 420 is to display the test results for the test engineer (system user) to view.

Referring to FIG. 2c, a more detailed diagram of an enhanced MIMO vibration testing system 200 for mechanical testing in accordance with embodiments of the present invention is shown. Blocks with reference numbers the same as other Figures are the same and perform the same functions as previously described. In the example shown in FIG. 2c, the system under test 220 includes 16 power amps 224 to drive multiple shakers 225 to drive the shake table and test article, and 24 control accelerometers M as the control sensor transducers described above. However, as explained above, there may be more or fewer power amps/drivers 224 and control accelerometers M. The enhanced MIMO vibration testing described in FIG. 2c functions as described previously in the description of simplified diagram FIG. 2a. However, as will be understood by those with ordinary skill in the art, the enhanced MIMO testing system shown in FIG. 2c is specifically configured for mechanical testing. The reference numbers 270, 280, 290, and 300 identify the processing blocks needed to measure the control response SDM [$G_{cc}(f)$] 300. The reference numbers 340, 350, 360, and 370 identify the processing blocks used to create the MIMO control system's 200 16 output-drives 370. The reference number 330 identify the block used to contain the control reference SDM [$G_{rr}(f)$] 330. The reference number 410 is for comparing [$G_{cc}(f)$] against its tolerance an abort bounds. The graphics subsystem 420 is to display the test results for the test engineer (system user) to view.

Referring to FIG. 5a, an example of a spectral density matrix (SDM), [$G_{rr}(f)$], is shown which represents the predetermined initial reference specification for the test, where the number of rows and columns is equal to M which corresponds to the number of control sensor transducers M, in accordance with an embodiment of the present invention. As will be understood by those with ordinary skill in the art, the diagonal elements represent the desired spectral magnitude responses at the locations of the control sensor transducers and the off diagonal elements represent desired specifications for relative coherence and phase between the responses of the control sensor locations, where the above diagonal rows are the transposed complex-conjugates of their corresponding below diagonal columns, to ensure a Hermitian and an at least positive semi-definite [$G_{rr}(f)$] result.

Referring to FIG. 5b, an example of an SDM, [$G_{cc}(f)$], is shown which represents the actual measured responses at the locations of the control sensor transducers during operation at a level substantially below the full testing level once a stable operating configuration is achieved, where the number of rows and columns is equal to M, which corresponds to the number of control sensor transducers M, in accordance with an embodiment of the present invention. As will be well understood by those with ordinary skill in the art, these actual measured responses will differ from the predetermined initial reference specification according to the many real-world limitations of the vibration test system and facility discussed previously. As described above, [$G_{cc}(f)$] is also required to be Hermitian and at least positive semi-definite, its above diagonal rows need to be the transposed complex-conjugates of their corresponding below diagonal columns.

Referring to FIG. 4, a simplified block diagram is shown of the creation of the SDM for the Modified Reference Specification [$G_{mod\_rr}(f)$] from the predetermined initial Reference Specification or a previously modified Reference Specification [$G_{rr}(f)$] and the SDM for control sensor transducer responses [$G_{cc}(f)$] in accordance with an embodiment of the present invention. Referring to FIG. 5c an example is shown of how the elements of the SDM for the Modified Reference Specification [$G_{mod\_rr}(f)$] are derived from the predetermined initial Reference Specification or a previously modified reference specification, [$G_{rr}(f)$] and the SDM for the control sensor transducer responses, [$G_{cc}(f)$] in accordance with an embodiment of the present invention. As shown in FIG. 5c, the diagonal elements of the Modified Reference Specification [$G_{mod\_rr}(f)$] are the same as the diagonal elements of the predetermined initial or previously modified Reference Specification [$G_{rr}(f)$], which represent the desired spectral magnitude responses at the control locations. The below diagonal elements, $K_{ijk}G_{cc}(i,j,f_k)$, of the Modified Reference Specification [$G_{mod\_rr}(f)$] are derived by creating the product of $K_{ijk}$, which is a ratio that is representative of the product between each control location pair implied by the predetermined initial reference specification divided by the product between each control location pair implied by the actual measured control location responses during low level operation according to the formula below for $K_{ijk}$, and the corresponding below diagonal element of [$G_{cc}(f)$], given by $G_{cc}(i,j,f_k)$ as shown in FIG. 5c.

$$K_{ijk} = \sqrt{\left(\frac{G_{rr}(i, i, f_k)G_{rr}(j, j, f_k)}{G_{cc}(i, i, f_k)G_{cc}(j, j, f_k)}\right)}$$

for k=1 to the number of spectral lines, i=2 to M, and j=1 to i−1, where the number of spectral lines are determined by the definition of $[G_{rr}(f)]$ consistent with the number of frequencies analyzed by the Fast Fourier Transform (FFT) spectrum analyzer used by the MIMO vibration controller used to determine $[G_{cc}(f)]$ SDM, as will be will be familiar to those with ordinary skill in the art.

As also shown in FIG. 5c, the above diagonal rows of $[G_{mod\_rr}(f)]$ are derived by taking the transposed complex conjugates of the previously obtained below diagonal columns of $[G_{mod\_rr}(f)]$. This ensures that the resulting SDM representing the resulting Modified Reference Specification $[G_{mod\_rr}(f)]$ is both at least positive semi-definite and Hermitian, while also being computationally efficient as compared to other formulations that may be mathematically equivalent, but not as efficient and may suffer from numerical precision problems that may produce ill-conditioned results. This method also ensures that the off diagonal elements of the resulting Modified Reference Specification $[G_{mod\_rr}(f)]$, which represent relative coherence and phase between control locations, incorporate the real-world limitations of the vibration test system and facility.

Referring to FIG. 3, a simplified block diagram of a MIMO vibration testing system operating at full testing level in accordance with an embodiment of the present invention is shown. Blocks with reference numbers the same as FIG. 2a are the same and perform the same functions as previously described. For full testing level operation the Modified Reference Specification is recalled from the Modified Reference Specification Storage 250 and loaded into the MIMO Vibration Controller 210 by the Reference Import 255. Once the Modified Reference Specification is loaded the vibration testing system operates in the normal manner using the Modified Reference Specification as the target specification for the responses at the control points. Since the Modified Reference Specification incorporates the actual performance of the vibration test system into the modified off diagonal elements describing phase and coherence relationships the resulting full level test performance is able to maintain a closer correspondence to the predetermined initial reference spectral specifications with less required system drive power, as a function of the predetermined initial reference, and less risk of damage to the test system and to the test article during the performance of a test.

Experiments have also shown that use of the Modified Reference Specification allows the vibration test system to achieve improved overall results for coherence and phase in addition to improved spectral uniformity and less required system drive power. Referring to FIGS. 6a, 6b and 6c results are shown comparing the performance of a conventional MIMO acoustic vibration testing system utilizing a Mixing and Filtering Subsystem such as disclosed in U.S. Pat. No. 9,683,912 to the embodiment in accordance with the present invention described in FIG. 2b. As will be readily understood by those with ordinary skill in the art significant improvements in spectral uniformity are shown in FIGS. 6a and 6b. Referring to FIG. 6c substantial improvements in reducing coherence are also shown.

In particular, FIG. 6a shows a comparison of the average of the diagonal elements of the control-response SDM $[G_{cc}(f)]$, obtained with an unmodified MIMO Acoustic Vibration Controller using a mixer to achieve rectangular control in conjunction with certain MIMO controllers that operate with square control, but with provisions for the mixer, as described in U.S. Pat. No. 9,683,912 B2, shown by its solid traces, and with an enhanced MIMO Acoustic Vibration Controller shown by FIG. 2b, also with the same mixer and square control as before, shown by its dashed traces, to show the improvement in the control performance that the invention provides. The first element of the initial reference spectral vector is also shown in FIG. 6a by the dash-dot trace, which also shows how well its average performance corresponds to the initial defined reference specification by the diagonal elements of $[G_{rr}(f)]$. FIG. 6a teaches that the average of the control-response SDM's diagonal elements obtained with the unmodified MIMO controller shown by its solid trace show greater errors and have a higher noise floor than those obtained with the enhanced MIMO controller using the invention shown by its dashed trace, thus illustrating the improvement that the new invention provides using the methods that have been described.

Further, FIG. 6b shows a comparison of the average of the diagonal elements of the control-response SDM $[G_{cc}(f)]$ obtained with an unmodified MIMO Acoustic Vibration Controller, during another test, using a mixer to achieve rectangular control in conjunction with certain MIMO controllers that operate with square control, but with provisions for the mixer shown by its solid trace, as in FIG. 6a, and with an enhanced MIMO Acoustic Vibration Controller, but this time using rectangular control and no mixer, to show the improvement in the control performance that the invention further provides, shown by its dashed trace. The first element of the initial reference spectral vector is also shown in FIG. 6b by the dash-dot trace, which also shows how well its average performance corresponds to the initially defined by the diagonal elements of $[G_{rr}(f)]$. FIG. 6b also teaches that the average of the control-response SDM's diagonal elements obtained with the unmodified MIMO controller (shown by its solid trace) show greater errors than those obtained with modified MIMO controller using the invention (shown by its dashed trace). Notice that the control performance obtained with the invention is now better with enhanced rectangular control than before with the square control obtained with the use of the Mixer shown by FIG. 6a. Thus, FIG. 6b teaches the further improvement that described invention provides in conjunction with enhanced rectangular control, as a result of the use of the methods that have been previously described.

FIG. 6c shows the comparison of achieved coherence between closely spaced control-transducers, obtained with an unmodified MIMO controller (by its solid trace), as in FIGS. 6a and 6b, and the achieved coherence using a modified MIMO controller as previously described (by its dashed trace). The lower chart shows the comparison of achieved coherence between control-transducers that are further apart that are obtained with an unmodified MIMO controller (shown by its solid trace), as in FIGS. 6a and 6b, and the achieved coherence using a modified MIMO controller as previously described (shown by its dashed trace). FIG. 6c teaches that the relative coherence between control-transducers SDM's off-diagonal elements obtained with the unmodified MIMO controller (shown by its solid trace) show greater relative coherence that the corresponding relative coherence obtained with modified MIMO controller using the invention (shown by its dashed trace). Thus for MIMO Acoustic Vibration control, the modified MIMO controller approximates a diffuse field much better than an unmodified MIMO controller, with its lower attained coherence, which is another primary goal of a MIMO acoustic vibration test.

Referring back to FIG. 2a, a simplified block diagram of a MIMO vibration testing system in accordance with another embodiment of the present invention is also shown. Blocks with reference numbers the same as previous Figures are the same and perform the same functions as previously described. In this case the previously stored Modified Reference Specification may be from a previous test or test setup or test conditions may have changed sufficiently to make further modification of the reference specification desirable. Accordingly, a Feedback Loop 230 as shown in FIG. 2a is provided so that after loading of the previously stored Modified Reference Specification the vibration test system can be operated at a level well below the full testing level and actual control location responses can be recorded as was the case for the previous discussion of FIG. 2a for the purpose of creating and recording a new Modified Reference Specification according to the same process described when referring to FIGS. 4, 5a, 5b and 5c. However, in this case the starting point is the Modified Reference Specification, $[G_{mod\_rr}(f)]$, which is combined with a new control response SDM, $[G_{cc}(f)]$, using the process previously described when referring to FIG. 4 and FIG. 5c to produce a new Modified Reference Specification, $[G_{mod\_rr}(f)]$, which can be stored for later use or may be loaded immediately and used for a full level test. Such additional modification of a previously modified reference specification eliminates the greater time required to create the first modified reference specification and may produce a further modified reference specification that permits the system to achieve even better results as test conditions change.

Recent testing has shown that manual modifications of the off-diagonal elements of the predetermined initial reference specification allow users to tradeoff the achieved spectral uniformity discussed above with respect to FIGS. 6a-6c for further reductions in required system drive power needed by a particular MIMO test, e.g. by modifying the predetermined initial reference specification "slightly" by increasing the specified relative coherence values in the initial reference's off-diagonal elements. Testing has shown that this effect is non-linear, which is dependent on the definition of the predetermined initial reference specification and the particular testing facility, where typically, the larger the modification the larger the reduction in required drive power, but also the larger the reduction in achieved control accuracy, but where smaller modifications, as described in the Summary above produce tolerable reductions in achieved control accuracy. FIG. 7 shows an example of some of these results, with a comparison of the required system drive PSDs (power spectral densities) between a test run using a modified reference specification obtained using an unmodified predetermined initial reference specification with all initially specified coherences between control microphone responses set to 0.0 for all frequencies, i.e. specifying a diffuse acoustic field, which is shown by the solid trace, and a second test run using a modified reference specification obtained with a modified predetermined initial reference specification with all references set to 0.05 for frequencies between 25 Hz and 50 Hz, i.e. specifying a nearly diffuse acoustic field, which is shown by the dashed trace. By looking at the 4 plots of the PSDs for each of the 4 drives used to excite each of 2 separate sets of speaker stacks, for a total of 8 speaker stacks that were used during the test, while using 24 control microphones. As can be seen, FIG. 7 clearly shows that the solid trace for each of the 4 drives has higher amplitudes in $V^2/Hz$ than the dashed trace, also in $V^2/Hz$, for frequencies between 25 Hz 50 Hz, by as much as a factors greater than 3, depending on the individual drive. Since the maximum drive power, as shown by the PSDs that display required speaker stack drive power density as a function of frequency, occurs in this range of frequencies, the use of the invention with a so modified predetermined initial reference specification, provides a greater reduction in required system drive power than using the unmodified predetermined initial reference, but at the expense of tolerable losses in subsequent control accuracy, as described above in the Summary. This reduction of power allows DFAT acoustic testing to be performed at higher acoustic levels with lower drive power, for the same speaker stack sets and their power amplifiers, due to this advantage, thus extending the use of loudspeakers for acoustic testing at higher acoustic levels. The same advantage occurs for mechanical testing as has been seen with other tests that have been performed. Since the power savings that the use of the invention with an unmodified predetermined initial reference is a function of the predetermined initial reference specification, the amount of power savings that using a modified predetermined initial reference provides will also be a function of the modified predetermined initial reference specification. But in many cases, to be able to reach a high test level, for either an acoustic or mechanical test with available test equipment, the use of a modified predetermined initial reference as this example shows, may be the difference between being able to perform the test or not with the test equipment that a particular test facility has available.

It will be apparent to those of ordinary skill in the art that many more variations may be implemented, which fall within the scope of the present invention. By way of example and not of limitation, these may include the incorporation into the MIMO Vibration Controller itself of the Feedback Loop 230, Modified Reference Specification Derivation 240 and Modified Reference Specification Storage 250 of FIG. 2a and FIG. 3. Alternatively, these elements can be configured with a suitable reference-specification loading device as an add-on for existing MIMO Vibration Controllers. Square and rectangular MIMO control schemes may be used with the present invention as well as drive mixing schemes such as disclosed in U.S. Pat. No. 9,683,912 all of which fall within the scope of the present invention. The existing predetermined initial reference specification entry software that existing MIMO control systems contain is used to modify the predetermined initial reference specification as described above and are as such part of the present invention. Additionally, there are numerous other methods of combining the initial reference specification with measured control location responses to derive or calculate elements for a Modified Reference Specification SDM, which is more representative of the actual capabilities of the vibration test system and facility. By way of example and not of limitation, matrix methods could be used to calculate $[G_{rr\_mod}(f)]$, instead of what is shown in FIG. 5c, which would approximate the results obtained as in FIG. 5c, but which may not yield a positive (semi-) definite and Hermitian matrix due to unavoidable numerical errors, and which would not be as computationally efficient as what FIG. 5c teaches. A further example and not of limitation, a simulation of the response characteristics test facility and of the MIMO vibration controller to obtain a "realistic" $[G_{cc}(f)]$ could be used with the method taught by FIG. 5c, or other such computational methods that yield an approximate resulting $[G_{rr\_mod}(f)]$, could be used, but which would be limited by the degree to which the so obtained $[G_{cc}(f)]$ captures the aforementioned testing and MIMO control limitations that may be present. All of these also fall within the scope of the present invention.

What is claimed is:

1. A vibration testing system comprising:
   at least two separately controllable groups of vibration transducers and at least two control sensor transducers;
   a controller coupled to the at least two separately controllable groups of vibration transducers and at least two control sensor transducers, wherein the controller is configured to
   run a vibration pre-test using MIMO control at substantially below a full test level utilizing a predetermined initial reference specification or a previously modified initial reference specification, and
   create a modified reference specification based on actual system performance during the vibration pre-test at substantially below a full test level, the controller creating the modified reference specification by
   utilizing the predetermined initial reference specification or previously modified initial reference specification, wherein the predetermined initial reference specification or previously modified initial reference specification is expressed as a reference spectral density matrix $[G_{rr}(f)]$,
   measuring control location responses during operation under the vibration pre-test using MIMO control at substantially below a full test level utilizing the predetermined initial reference specification or the previously modified initial reference specification, wherein the control location responses are represented by a control response spectral density matrix $[G_{cc}(f)]$, and
   creating the modified reference specification expressed as a modified spectral density matrix $[G_{mod\_rr}(f)]$, wherein the diagonal elements of the modified spectral density matrix $[G_{mod\_rr}(f)]$ are the same as in the reference spectral density matrix $[G_{rr}(f)]$ and wherein each of the below diagonal elements of the modified spectral density matrix $[G_{mod\_rr}(f)]$ are equal to the below diagonal elements of the reference spectral $[G_{rr}(f)]$ multiplied by a factor, $[K_{ijk}]$, which is a ratio that is representative of the product between each control location pair implied by the predetermined initial reference specification or the previously modified initial reference specification divided by the product between each control location pair implied by the actual measured control location responses during low level operation, and wherein the above diagonal rows of the modified spectral density matrix $[G_{mod\_rr}(f)]$ are equal to the complex conjugate transpose of the below diagonal columns of the modified spectral density matrix $[G_{mod\_rr}(f)]$.

2. The vibration testing system of claim 1, wherein the previously modified initial reference specification is obtained by manually increasing values of chosen off-diagonal coherence elements of an initial reference spectral density matrix slightly to tradeoff how close the correspondence to the diagonal elements of the reference spectral density matrix $[G_{rr}(f)]$ and the control response spectral density matrix $[G_{cc}(f)]$ are in a subsequent test that uses the modified spectral density matrix $[G_{mod\_rr}(f)]$ that results from using the previously modified initial reference specification, in order to further reduce required system drive power within chosen frequency ranges, as compared to a test run with a modified spectral density matrix [Gmod_rr(f)] obtained using an unmodified predetermined initial reference specification, given the same testing facility and test conditions.

3. The vibration testing system of claim 2, wherein the at least two separately controllable groups of vibration transducers are acoustic transducers and the at least two control sensor transducers are control microphones.

4. The vibration testing system of claim 2, wherein the at least two separately controllable groups of vibration transducers are shakers and the at least two control sensor transducers are accelerometers or other mechanical vibration sensing transducers.

5. A method of vibration testing a test article, the method comprising:
   running a vibration pre-test using MIMO control at substantially below a full test level utilizing a predetermined initial reference specification or a previously modified initial reference specification using a system having at least two separately controllable groups of vibration transducers and at least two control sensor transducers, and
   creating a modified reference specification based on actual system performance during the vibration pre-test at substantially below a full test level,
   wherein the step of creating the modified reference specification comprises:
   utilizing the predetermined initial reference specification or previously modified initial reference specification, wherein the predetermined initial reference specification or previously modified initial reference specification is expressed as a reference spectral density matrix $[G_{rr}(f)]$,
   measuring control location responses during operation under the vibration pre-test using MIMO control at substantially below a full test level utilizing the predetermined initial reference specification or the previously modified reference, wherein the control location responses are represented by a control response spectral density matrix $[G_{cc}(f)]$, and
   creating the modified reference specification expressed as a modified spectral density matrix $[G_{mod\_rr}(f)]$, wherein the diagonal elements of the modified spectral density matrix $[G_{mod\_rr}(f)]$ are the same as in the reference spectral density matrix $[G_{rr}(f)]$ and wherein each of the below diagonal elements of the modified spectral density matrix $[G_{mod\_rr}(f)]$ are equal to the below diagonal elements of the reference spectral $[G_{rr}(f)]$ multiplied by a factor, $[K_{ijk}]$, which is a ratio that is representative of the product between each control location pair implied by the predetermined initial reference specification divided by the product between each control location pair implied by the actual measured control location responses during low level operation, and wherein the above diagonal rows of the modified spectral density matrix $[G_{mod\_rr}(f)]$ are equal to the complex conjugate transposes of the below diagonal columns of the modified spectral density matrix $[G_{mod\_rr}(f)]$.

6. The method of claim 5, wherein the at least two separately controllable groups of vibration transducers are acoustic transducers and the at least two control sensor transducers are control microphones.

7. The method of claim 5, wherein the at least two separately controllable groups of vibration transducers are shakers and the at least two control sensor transducers are accelerometers.

* * * * *